(12) United States Patent
Kwon et al.

(10) Patent No.: US 11,692,844 B2
(45) Date of Patent: *Jul. 4, 2023

(54) APPARATUS FOR DISPLAYING INFORMATION OF A VEHICLE AND METHOD THEREOF

(71) Applicants: Hyundai Motor Company, Seoul (KR); Kia Motors Corporation, Seoul (KR)

(72) Inventors: Su Jin Kwon, Gyeonggi-do (KR); Bum Hee Chung, Seoul (KR); Paul Choo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,489

(22) Filed: Aug. 25, 2020

(65) Prior Publication Data

US 2021/0325204 A1   Oct. 21, 2021

(30) Foreign Application Priority Data

Apr. 21, 2020   (KR) .................. 10-2020-0048170

(51) Int. Cl.
| | |
|---|---|
| *G01C 21/36* | (2006.01) |
| *G06F 3/14* | (2006.01) |
| *G06T 11/00* | (2006.01) |
| *G01C 21/34* | (2006.01) |
| *G06T 17/05* | (2011.01) |
| *G06T 11/20* | (2006.01) |

(52) U.S. Cl.
CPC ..... *G01C 21/3667* (2013.01); *G01C 21/3492* (2013.01); *G01C 21/3632* (2013.01); *G06F 3/14* (2013.01); *G06T 11/001* (2013.01); *G06T 11/203* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 6,169,552 B1 * | 1/2001 | Endo | .................. G01C 21/3638 345/427 |
| 9,459,115 B1 * | 10/2016 | Elliott | .............. G08G 1/096861 |
| 2007/0057781 A1 | 3/2007 | Breed | |
| 2011/0166783 A1 | 7/2011 | Ren et al. | |
| 2011/0264362 A1 | 10/2011 | Van Raamsdonk et al. | |

(Continued)

OTHER PUBLICATIONS

Y. Park, "The Genesis GV80, equipped with advance IT such as an augmented reality navigation system, handwriting-recognition function, and simple payment etc.", www.ebn.co.kr/news/prints/1008255 (Nov. 7, 2019).

(Continued)

*Primary Examiner* — Jeffrey J Chow
(74) *Attorney, Agent, or Firm* — Fox Rothschild LLP (57) ABSTRACT

A display apparatus for a vehicle includes: a controller configured to create map information; and a display device configured to display the map information created by the controller, wherein the controller controls the display device to display a path guidance texture based on a road shape when guiding a path among the map information.

17 Claims, 8 Drawing Sheets

<301>

<302>

(56) References Cited

U.S. PATENT DOCUMENTS

| | | | |
|---|---|---|---|
| 2011/0313653 A1* | 12/2011 | Lindner | G01C 21/3647 |
| | | | 701/523 |
| 2013/0322634 A1* | 12/2013 | Bennett | G10L 21/00 |
| | | | 381/17 |
| 2016/0003636 A1* | 1/2016 | Ng-Thow-Hing | G06V 20/588 |
| | | | 701/418 |
| 2016/0138933 A1* | 5/2016 | Yamaguchi | G09B 29/007 |
| | | | 701/532 |
| 2017/0205885 A1 | 7/2017 | Schpok | |
| 2017/0285648 A1 | 10/2017 | Welty et al. | |
| 2018/0195877 A1* | 7/2018 | Liao | G08G 1/096838 |
| 2019/0250006 A1* | 8/2019 | Lu | G01C 21/362 |
| 2019/0266890 A1* | 8/2019 | Lei | G08G 1/09675 |
| 2019/0360821 A1 | 11/2019 | Schertz et al. | |
| 2020/0064147 A1* | 2/2020 | Sliney | G01C 21/3492 |
| 2020/0116518 A1 | 4/2020 | Lee | |
| 2020/0219325 A1 | 7/2020 | Seo et al. | |
| 2021/0003414 A1 | 1/2021 | Yamaguchi et al. | |

OTHER PUBLICATIONS

NAVER Cafe, "The mode setting of the Genesis GV 80 navigation includes the neon view mode", Genesis GV80 Club Main Cafe, (Feb. 6, 2020).

* cited by examiner

APPARATUS FOR DISPLAYING INFORMATION OF A VEHICLE AND METHOD THEREOF

CROSS-REFERENCE TO RELATED APPLICATION

This application claims under 35 U.S.C. § 119(a) the benefit of Korean Patent Application No. 10-2020-0048170, filed in the Korean Intellectual Property Office on Apr. 21, 2020, the entire contents of which are incorporated herein by reference.

BACKGROUND

(a) Technical Field

The present disclosure relates to a display apparatus for a vehicle and a method thereof, more particularly, to a technique for displaying vehicle information to enable a driver to intuitively recognize it.

(b) Description of the Related Art

A vehicle navigation displays various information as well as path guidance. However, there are certain restrictions on the displayed information such as a size and a viewpoint of a screen, in order to ensure driving stability.

An information display method of an existing vehicle navigation has been in use for a long time, so there is a drawback that it is difficult to change it.

Figure 1:
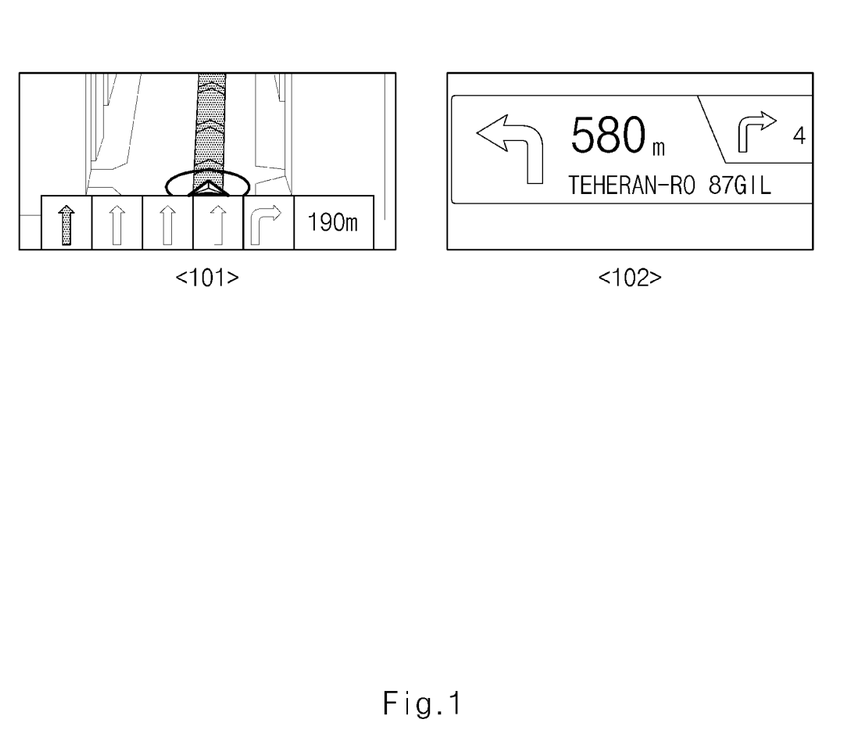
FIG. 1 (RELATED ART) illustrates an example of map information displayed in a vehicle.

FIG. 1 (RELATED ART) illustrates an example of displaying information using an existing navigation, in which a screen 101 shows a method of displaying a path and a current location of a host vehicle, and a screen 102 shows an arrow display method for guiding a rotation point.

For example, existing navigation information typically utilizes a display method and a form of an existing map, which can provide high cognition based on familiarity, but typically requires a long learning period, and in many cases, may be unsuitable for allowing driver recognition because it is more detailed than necessary or an amount of information is excessive.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a display apparatus for a vehicle and a method thereof, which can improve an aesthetic appearance and enhance driving stability by displaying vehicle information in a more intuitive manner on a display device.

An exemplary embodiment of the present disclosure provides a display apparatus for a vehicle, including: a controller configured to create map information; and a display device configured to display the map information created by the controller, wherein the controller controls the display device to display a path guidance texture based on a road shape when guiding a path among the map information.

In an exemplary embodiment, the controller may display an arrow at a rotation point among the map information according to an angle of a path line when performing rotation point guidance among the map information.

In an exemplary embodiment, the controller may display the arrow to overlap the path line thereon at the rotation point.

In an exemplary embodiment, the controller may apply gradations to an upper end of the structure among the map information.

In an exemplary embodiment, the controller may control an gradation area to be adjusted in proportion to a height of a building among the structure in proportion to the height of the building by applying gradations to an upper end of a wall surface of the building.

In an exemplary embodiment, the controller may highlight essential information when one or more pieces of information overlap among the map information.

In an exemplary embodiment, the essential information may include at least one of current location information of a host vehicle, path line information, and traffic accident information.

In an exemplary embodiment, the controller may preferentially highlight the essential information when the essential information overlaps surrounding information in the case where a path is guided based on an additive mixing method.

In an exemplary embodiment, the controller may set a host vehicle indicating a current location of the host vehicle to be displayed on the path line when the path line and the host vehicle mark overlap.

In an exemplary embodiment, the controller may gradiently set a color of a path line among the map information is set to be gradient.

In an exemplary embodiment, the controller may display the color of the path line from a current location of a host vehicle to a destination among the map information step by step.

In an exemplary embodiment, the controller may display the color of the path line from a current location of a host vehicle to a point of interest among the map information step by step.

An exemplary embodiment of the present disclosure provides a display method for a vehicle, including: creating, by a controller, map information; and displaying, by a display device, a path guidance texture based on a road shape when guiding a path among the map information.

In an exemplary embodiment, the displaying of the path guidance texture may include displaying an arrow at a rotation point among the map information according to an angle of a path line when performing rotation point guidance among the map information.

In an exemplary embodiment, the displaying of the arrow may include displaying the arrow to overlap the path line thereon at the rotation point.

In an exemplary embodiment, the display method may further include applying gradations to an upper end of the structure among the map information.

In an exemplary embodiment, the applying of the gradations may include applying gradations to an upper end of the structure among the map information.

In an exemplary embodiment, the applying of the gradations may include controlling an gradation area to be adjusted in proportion to a height of a building among the structure in proportion to the height of the building by applying gradations to an upper end of a wall surface of the building.

In an exemplary embodiment, the display method may further include highlighting essential information when one or more pieces of information overlap among the map information.

In an exemplary embodiment, the highlighting of the essential information may include preferentially highlighting the essential information when the essential information overlaps surrounding information in the case where a path is guided based on an additive mixing method.

According to the technique, it is possible to improve an aesthetic appearance and driving stability by displaying vehicle information in a more intuitive manner on a display device.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a technique for more intuitively display vehicle information by expressing a structure such that a height and a length of the structure can be easily recognized at a limited viewing angle for displaying vehicle information, by displaying a path guidance arrow reflecting a shape of a road, and by applying a method of preferentially performing a display based on a host vehicle or the like when information is overlapped on a map, thereby enabling a driver to accurately recognize the vehicle information even in a short moment.

Hereinafter, exemplary embodiments of the present disclosure will be described in detail with reference to FIGS. 2 to 8.

Figure 2:
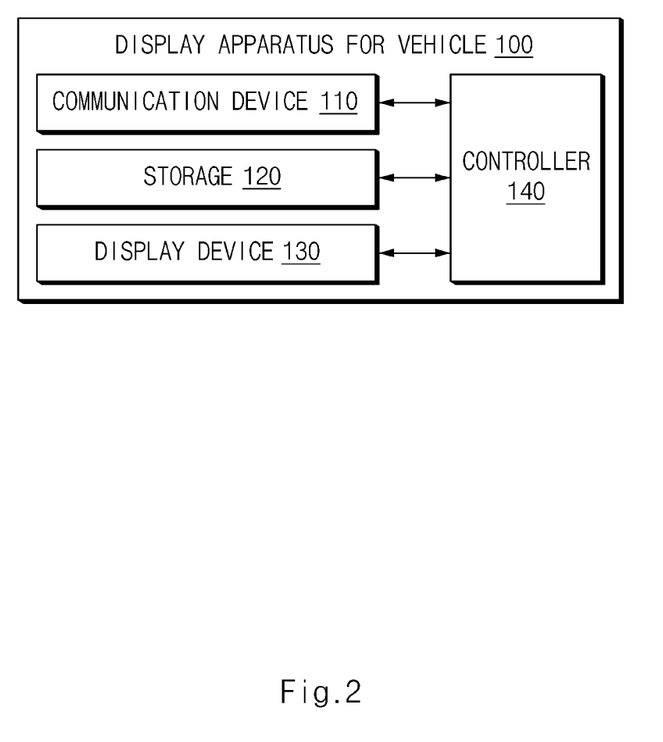
FIG. 2 illustrates a block diagram showing a configuration of a display apparatus for a vehicle according to an exemplary embodiment of the present disclosure.

FIG. 2 illustrates a block diagram showing a configuration of a display apparatus for a vehicle according to an exemplary embodiment of the present disclosure.

Referring to FIG. 2, according to an exemplary embodiment of the present disclosure, the display apparatus 100 for the vehicle may be implemented inside the vehicle. In this case, the display apparatus 100 may be integrally formed with internal control units of the vehicle, or may be implemented as a separate device to be connected to control units of the vehicle by a separate connection device.

The display apparatus 100 may display vehicle information (e.g., map information, vehicle driving information, etc.) in various ways. For example, the vehicle information may be displayed as a general flat map, a 3D map, or the like, and in the present disclosure, an intuitive display technique may be applied in displaying all information that can be displayed on a display apparatus as well as a vehicle.

To this end, the display apparatus 100 may include a communication device 110, a storage 120, a display device 130, and a controller 140.

The communication device 110, which is a hardware device implemented with various electronic circuits to transmit and receive signals through a wireless or wired connection, may perform V2I communication by using an in-vehicle network communication technique or a wireless Internet access or short range communication technique with servers, infrastructure, and other vehicles outside the vehicle in the present disclosure. Herein, in-vehicle communication may be performed through controller area network (CAN) communication, local interconnect network (LIN) communication, or flex-ray communication as the in-vehicle network communication technique. In addition, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

As an example, the communication device 110 may transmit or receive information related to surrounding conditions of a driving road, e.g., vehicle accidents, road construction, traffic congestion, and the like with respect to surrounding vehicles or surrounding infrastructure. Subsequently, the controller 140 may reflect information related to the surrounding conditions of the driving road, received from the communication device 110 on map information.

As an example, the storage 120 may store map information, and the like for providing a path. In addition, the storage 120 may store information such as a driving situation and a driving/traffic situation (e.g., an accident, road construction, traffic congestion, etc.) received through V2X communication. The storage 120 may also store instructions and/or algorithms for generating map information by the controller 140.

The storage 120 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The display device 130 may include a display, and may also include a voice output device such as a speaker.

As an example, the display device 130 may display the driving situation, map information, path information, and the like, and may display map information in an intuitive manner. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), a an organic light emitting diode display (OLED display), a flexible display, a field emission display (FED), and a 3D display.

The display device 130 may be implemented as a head-up display (HUD), a cluster, an audio video navigation (AVN), or a human machine interface (HMI). In addition, the display device 130 may include at least one of a liquid crystal display (LCD), a thin film transistor liquid crystal display (TFT LCD or thin film transistor-LCD), a light emitting diode (LED) display, an organic light emitting diode (OLED or organic LED) display, an active OLED (AMOLED or active matrix OLED) display, a flexible display, a bended display, and a 3D display. Some of these displays may be implemented as a transparent display formed of a transparent or translucent type such that the outside can be viewed. In addition, the display device 130 may be provided as a touch screen including a touch panel, and may be used as an input device as well as an output device.

In this case, the display device 130 may include an input device for receiving a control instruction from a user, and the input device may include a key button, and may also include a mouse, a joystick, a jog shuttle, a stylus pen, or the like. In addition, the input device 250 may include a soft key implemented on the display.

The processor 140 may be electrically connected to the communication device 110, the storage 120, the display device 130, and the like, may electrically control each component, and may be an electrical circuit that executes software commands, thereby performing various data processing and calculations described below. The controller 140 may be, e.g., an electronic control unit (ECU), a micro controller unit (MCU), or other subcontrollers mounted in the vehicle.

Figure 3:
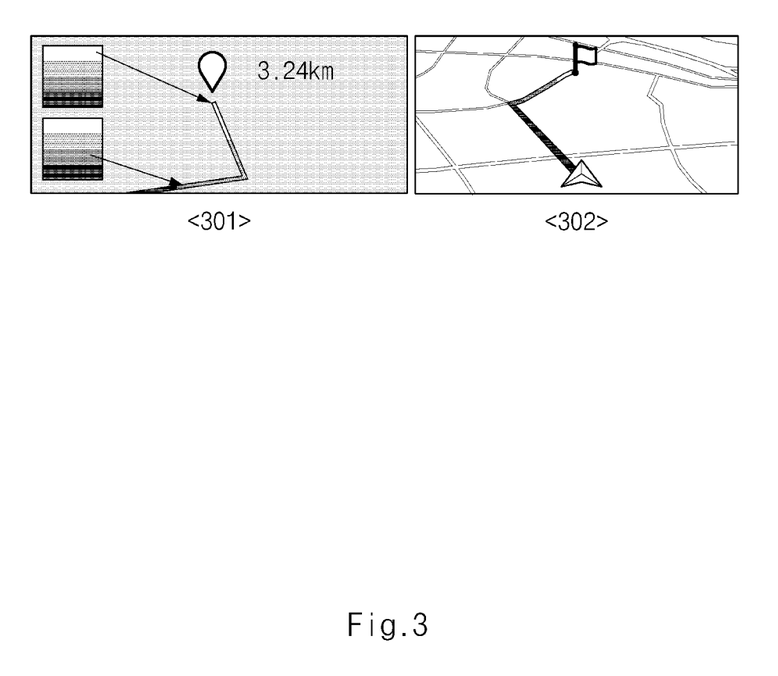
FIG. 3 illustrates an example of a screen on which a color of a path is gradiently displayed in map information according to an exemplary embodiment of the present disclosure.
Figure 4:
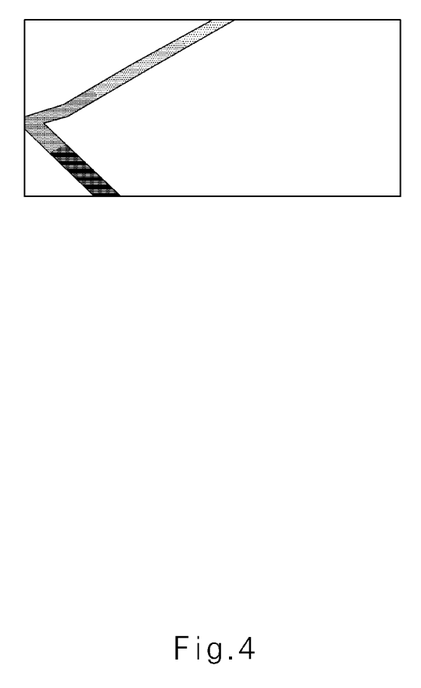
FIG. 4 illustrates an enlarged view showing an example of a screen on which a color of a path is gradiently displayed in map information according to an exemplary embodiment of the present disclosure.

The controller 140 may gradiently set a color of a path line among map information. That is, the controller 140 may display the color of the path line from a current location of a host vehicle to a destination among the map information step by step, and the color of the path line to a point registered in advance by a user as important information, such as a waypoint, a point of interest, or a gas station as well as the destination, may be displayed step by step. FIG. 3 illustrates an example of a screen on which a color of a path is gradiently displayed in map information according to an exemplary embodiment of the present disclosure, and FIG. 4 illustrates an enlarged view showing an example of a screen on which a color of a path is gradiently displayed in map information according to an exemplary embodiment of the present disclosure.

Referring to screens 301 and 302 of FIG. 3, it can be seen that the color of the path line from the current location of the host vehicle to the destination gradually fades. FIG. 4 illustrates an enlarged view of the path line, and it can be seen that it is displayed in at least one color level. Accordingly, the user may recognize a total driving distance or a driving progress by checking the color level of the path line without checking the entire path.

Figure 5:
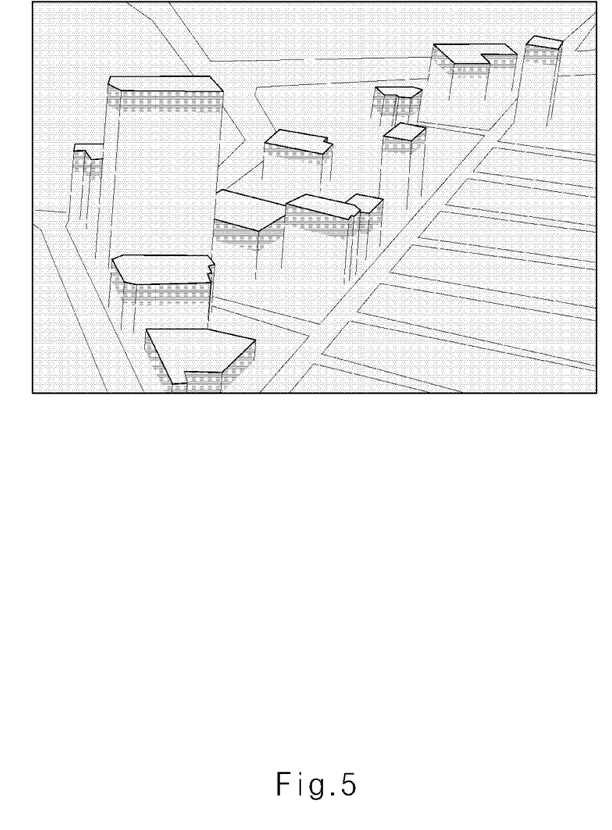
FIG. 5 illustrates an example of a screen on which a height and a length of a structure is displayed in map information according to an exemplary embodiment of the present disclosure.

The controller 140 may apply gradations to an upper end of a structure among the map information. That is, the controller 140 may control a height and length of a building to be displayed by applying gradations to an upper end of a wall surface of the building among the structure. That is, the controller 140 may control a gradation area to be adjusted in proportion to the height of the building. FIG. 5 illustrates an example of a screen on which a height and a length of a structure is displayed in map information according to an exemplary embodiment of the present disclosure. Referring to FIG. 5, it can be seen that gradations are displayed on an upper wall surface of the building. In this way, it is possible to intuitively recognize the height or the length of the building as the gradations are displayed on the upper wall surface of the building. FIG. 5 illustrates an example applied to 3D map information, but the present disclosure is not limited thereto, and may be applied to all map information on which buildings are displayed.

The controller 140 may control to display a path guidance texture based on a road shape when a path is guided among map information. In this case, the path guidance texture may include an arrow or the like.

Figure 6:
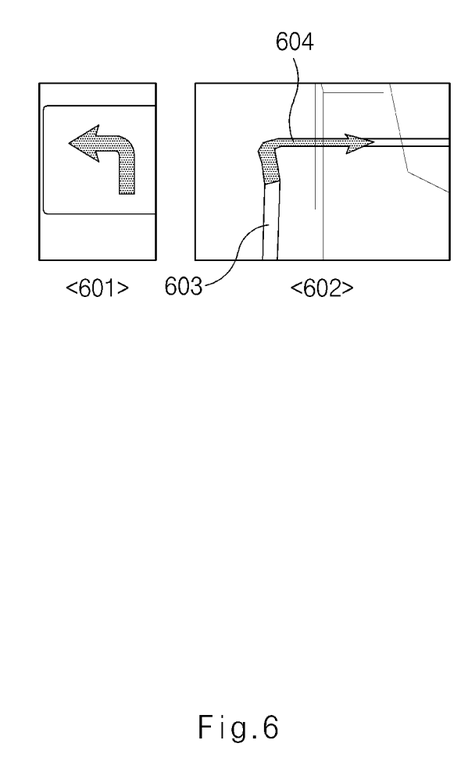
FIG. 6 illustrates an example of a screen for displaying a path guidance arrow based on a road shape in map information according to an exemplary embodiment of the present disclosure.

When rotation point guidance is performed among the map information, the controller 140 displays an arrow at a rotation point among the map information, but may display the arrow depending on an angle of the path line. That is, the controller 140 may display the arrow to overlap the path line thereon at the rotation point. FIG. 6 illustrates an example of a screen for displaying a path guidance arrow based on a road shape in map information according to an exemplary embodiment of the present disclosure. Referring to FIG. 6, a user can accurately recognize an angle of a path in which a vehicle should rotate by generating and displaying an arrow based on an actual road shape.

The controller 140 may highlight essential information when one or more pieces of information overlap among map information. In this case, the essential information may include at least one of current location information of the host vehicle, path line information, and traffic accident information.

Figure 7:
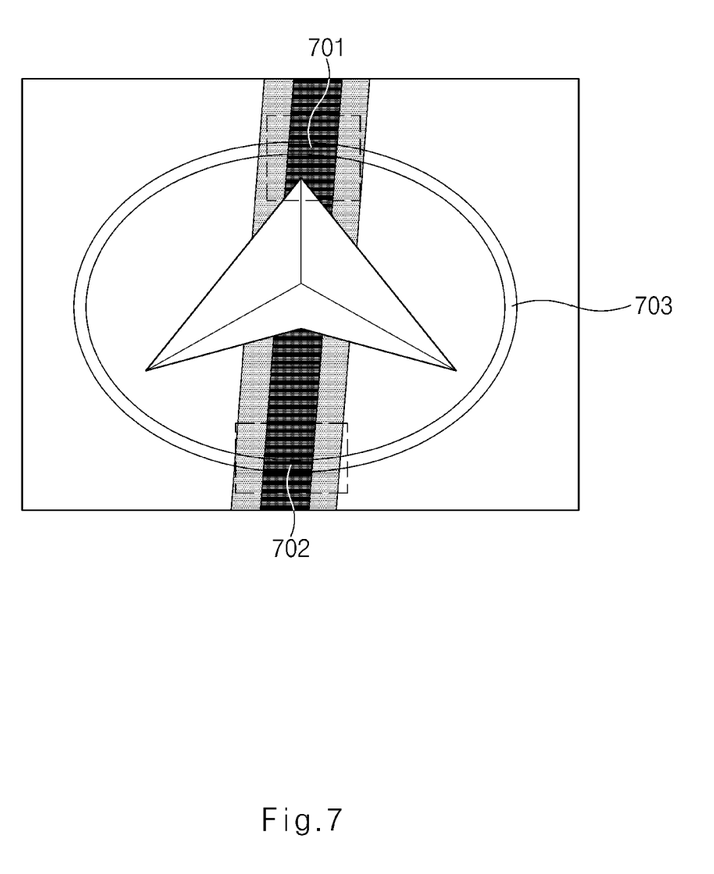
FIG. 7 illustrates a display example screen by an additive mixing method of a host vehicle and a path line in map information according to an exemplary embodiment of the present disclosure.

In the case where a path is guided based on the additive mixing method, the controller 140 may preferentially highlight essential information when the essential information overlaps surrounding information, and may set a host vehicle indicating a current location of the host vehicle to be displayed on the path line when the path line and the host vehicle mark overlap. FIG. 7 illustrates a display example screen by an additive mixing method of a host vehicle and a path line in map information according to an exemplary embodiment of the present disclosure. Referring to FIG. 7, the host vehicle mark, which is most important for the path guidance, may be displayed on all information (the path line and the surrounding information), and shadow processing for highlighting, light processing, and the like may be performed. In this case, emergency information such as traffic accident information may be highlighted and displayed in preference to the host vehicle mark.

This intuitive information display method may be applied to a variety of map information, such as a general navigation map, a 2D map, a 3D map, and a neon view-based map.

Figure 8:
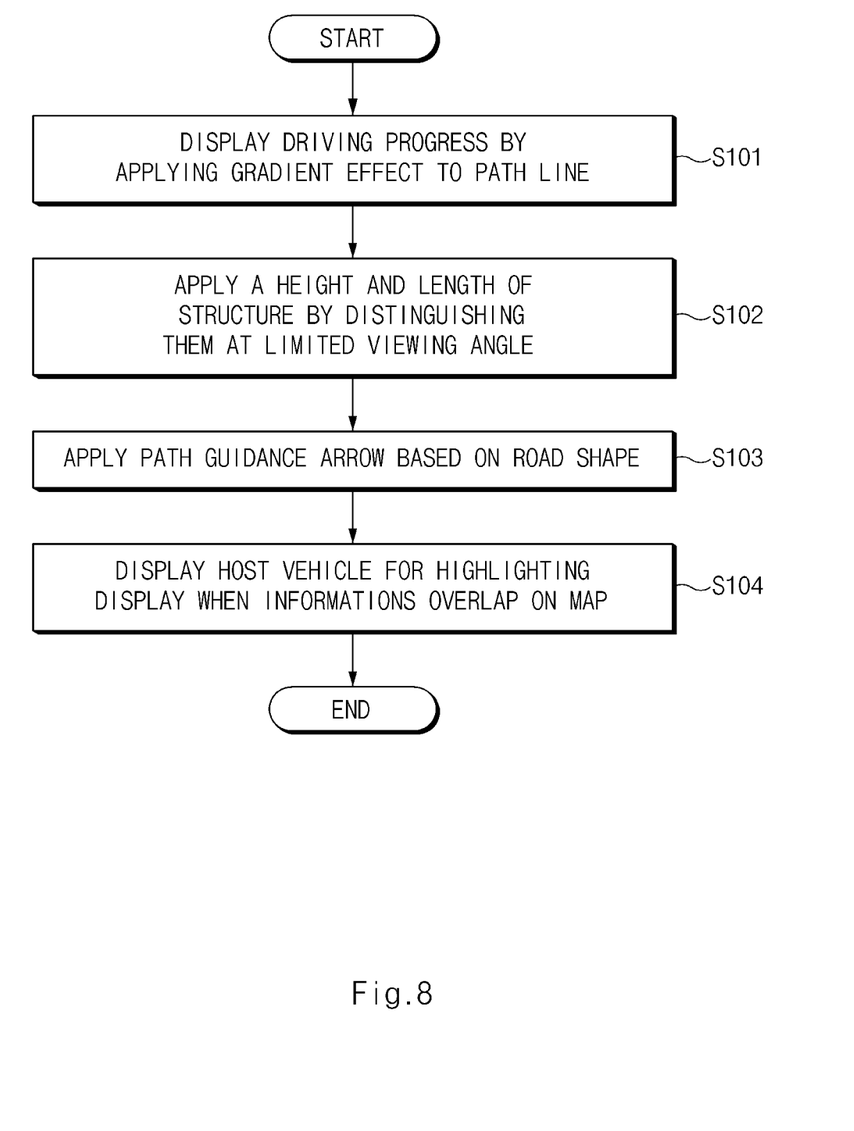
FIG. 8 illustrates a flowchart for describing a method for displaying vehicle information according to an exemplary embodiment of the present disclosure.

Hereinafter, a method for displaying vehicle information according to an exemplary embodiment of the present disclosure will be described in detail with reference to FIG. 8. FIG. 8 illustrates a flowchart for describing a method for displaying vehicle information according to an exemplary embodiment of the present disclosure.

As provided herein, the display apparatus 100 of the vehicle of FIG. 1 is configured to perform a process of FIG. 8. In addition, in the description of FIG. 8, operations described as being performed by a device may be understood as being controlled by the controller 140 of the display apparatus 100.

Referring to FIG. 8, the display apparatus 100 displays a driving progress by applying a gradient effect to a path line on map information (S101). That is, a user can check the driving progress without checking the entire path by displaying a color of the path line as a color level from a starting point to a destination, instead of a pattern that emphasizes directionality as before. In addition, the display apparatus 100 may allow a user to estimate a total driving distance, a remaining driving distance, etc., by applying a gradient effect depending on the driving distance even when the user does not check the entire path. Color level display of the path line may be used to display not only the destination but also a location of a surrounding POI depending on a vehicle state. In screens 301 and 302, examples in which the color of the path line is gradiently set on various 3D maps are illustrated. Accordingly, the user can check the driving progress of the host vehicle by simply checking a color change of the path line as illustrated in FIG. 4 even without checking the entire path. FIG. 3 illustrates an example in which the color of the path line is gradiently set in a 3D map, but the present disclosure is not limited thereto, and the above-described technique may be applied to all map information indicating the path line.

The display apparatus 100 may apply a height and length of a structure by distinguishing them at a limited viewing angle (S102). Due to a characteristic of the 3D map, when a display level that is suitable for driving (e.g., 100 to 250 m) is maintained, it is difficult to match the map to an actual field of view through a height of a building because upper sides of most buildings are not displayed. Accordingly, in the present disclosure, a height value of a currently displayed building may be inferred by applying gradations to the height of the building. As a result, the user may accurately grasp the map information in a short time, thereby enabling more accurate and safe driving. Referring to FIG. 5, it can be seen that gradations are applied to the upper side of the building.

Subsequently, the display apparatus 100 may apply a path guidance arrow based on a road shape (S103). For an existing arrow as illustrated in FIG. 3, it is difficult to express curvature or shape change of an actual road by using an arrow drawn at a predetermined angle. As a result, a driver has a burden of supplementing information through personal experiences and perspectives. Accordingly, in the present disclosure, the arrow based on the road shape is applied as shown in a screen 602 of FIG. 6. The arrow based on the road shape, which is created and displayed based on an actual road shape, can accurately transfer an angle at which a vehicle should drive, and can be widely used in various display areas (e.g. HUD) where a map cannot be displayed.

The display apparatus 100 displays the host vehicle for highlighting display when one or more pieces of information overlap on the map (S104).

In the case of the 3D map, when there is a large amount of information, overlap of information occurs, and uniform transparency is applied, discernment of information significantly decreases as the overlap increases. An overlapping method of a specific structure may be applied as an additive mixing method rather than a subtractive mixing method of transparency adjustment in order to overcome this phenomenon. That is, when guiding the path, it is possible to unconditionally emphasize the host vehicle mark, the path line, and the like which are important information that the user must recognize, regardless of the overlap. Such a highlighting method by the additive mixing method of the important information may be used to display other vehicles for advanced driver assistance systems (ADAS) functions, and information on traffic accidents.

As described above, according to the present disclosure, it is possible to provide various information such as location, height, distance, and destination information, POI information, etc. by using only design elements, it can be differentiated from existing navigation information, and it is possible to provide richer information through appropriate change of the elements.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A display apparatus for a vehicle, comprising:
a controller configured to create map information; and
a display device configured to display the map information created by the controller,
wherein the controller controls the display device to display a path guidance texture based on a road shape when guiding a path among the map information,
wherein the controller displays the color of the path line from a current location of a host vehicle to a destination among the map information step by step;
wherein the controller gradiently sets a color of a path line among the map information is set to be gradient; and
wherein the gradient effect depends upon a driving distance.

2. The display apparatus of claim 1, wherein the controller displays an arrow at a rotation point among the map information according to an angle of a path line when performing rotation point guidance among the map information.

3. The display apparatus of claim 2, wherein the controller displays the arrow to overlap the path line thereon at the rotation point.

4. The display apparatus of claim 1, wherein the controller applies gradations to an upper end of a structure among the map information.

5. The display apparatus of claim 4, wherein the controller controls a gradation area to be adjusted in proportion to a height of a building among the structure in proportion to the height of the building by applying gradations to an upper end of a wall surface of the building.

6. The display apparatus of claim 1, wherein the controller highlights essential information when one or more pieces of information overlap among the map information.

7. The display apparatus of claim 6, wherein the essential information includes at least one of current location information of a host vehicle, path line information, and traffic accident information.

8. The display apparatus of claim 6, wherein the controller preferentially highlights the essential information when the essential information overlaps surrounding information in a case where a path is guided based on an additive mixing method.

9. The display apparatus of claim 8, wherein the controller set a host vehicle indicating a current location of the host vehicle to be displayed on the path line when the path line and the host vehicle mark overlap.

10. The display apparatus of claim 1, wherein the controller displays the color of the path line from a current location of a host vehicle to a point of interest among the map information step by step.

11. A display method for a vehicle, comprising:
creating, by a controller, map information; and
displaying, by a display device, a path guidance texture based on a road shape when guiding a path among the map information
wherein displaying the path guidance texture includes displaying the color of the path line from a current location of a host vehicle to a destination among the map information step by step;
wherein the controller gradiently sets a color of a path line among the map information is set to be gradient; and
wherein the gradient effect depends upon a driving distance.

12. The display method of claim 11, wherein displaying the path guidance texture includes displaying an arrow at a rotation point among the map information according to an angle of a path line when performing rotation point guidance among the map information.

13. The display method of claim 12, wherein displaying the arrow includes displaying the arrow to overlap the path line thereon at the rotation point.

14. The display method of claim 11, further comprising:
applying gradations to an upper end of a structure among the map information.

15. The display method of claim 14, wherein applying the gradations includes controlling a gradation area to be adjusted in proportion to a height of a building among the structure in proportion to the height of the building by applying gradations to an upper end of a wall surface of the building.

16. The display method of claim 11, further comprising:
highlighting essential information when one or more pieces of information overlap among the map information.

17. The display method of claim 16, wherein highlighting the essential information includes preferentially highlighting the essential information when the essential information overlaps surrounding information in a case where a path is guided based on an additive mixing method.

* * * * *